US009800845B2

(12) United States Patent
Dietz (10) Patent No.: US 9,800,845 B2
(45) Date of Patent: Oct. 24, 2017

(54) PROJECTOR-BASED CROWD COORDINATION AND MESSAGING

(71) Applicant: Microsoft Corporation, Redmond, WA (US)

(72) Inventor: Paul H. Dietz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 191 days.

(21) Appl. No.: 14/175,399

(22) Filed: Feb. 7, 2014

(65) Prior Publication Data

US 2015/0229894 A1  Aug. 13, 2015

(51) Int. Cl.
*H04N 9/31* (2006.01)
*G06T 11/00* (2006.01)

(52) U.S. Cl.
CPC ......... *H04N 9/3147* (2013.01); *G06T 11/001* (2013.01)

(58) Field of Classification Search
CPC ........ G09G 3/002; G09G 3/003; G09G 3/004; G09G 3/005
See application file for complete search history.

(56) References Cited

U.S. PATENT DOCUMENTS

| 5,988,817 | A  | * | 11/1999 | Mizushima | G09F 19/18 352/133 |
| 7,911,412 | B2 | * | 3/2011  | Benner, Jr. | H04N 9/3129 345/55 |
| 7,948,448 | B2 |   | 5/2011  | Hutchinson et al. | |
| 7,980,707 | B2 | * | 7/2011  | Murphy | A63J 99/00 353/121 |

(Continued)

FOREIGN PATENT DOCUMENTS

EP   2347809 A1   7/2011

OTHER PUBLICATIONS

Schwarz, et al., "Phone as a Pixel: Enabling Ad-Hoc, Large-Scale Displays Using Mobile Devices", In Proceedings of CHI Conference on Human Factors in Computing Systems, May 5, 2012, pp. 2235-2238.

(Continued)

*Primary Examiner* — Antonio A Caschera
(74) *Attorney, Agent, or Firm* — Lyon & Harr, LLP; Richaro T. Lyon (57) ABSTRACT

Projector-based crowd coordination and messaging embodiments that separately, yet simultaneously, convey information to members of an audience in at least one part of a venue. The information conveyed to each audience member is different from the information conveyed to at least one other audience member based on their locations within the venue. In single-projector embodiments, an optical projector is mounted within the venue and projects an image onto the audience. In multiple-projector embodiments, an array of optical projectors are mounted within the venue, each of which projects an image onto the audience. In either case, for each of a plurality of prescribed locations in the audience, each optical projector projects light of a prescribed color and brightness onto the location, where the light from the projector, or projectors collectively, represents the information conveyed to an audience member or members in the location.

19 Claims, 5 Drawing Sheets

(56) References Cited

U.S. PATENT DOCUMENTS

| | | | |
|---|---|---|---|
| 8,194,118 B2* | 6/2012 | Solomon | H04N 13/0402 348/42 |
| 2007/0156883 A1 | 7/2007 | Thompson et al. | |
| 2008/0106654 A1* | 5/2008 | Benner | H04N 9/3129 348/745 |
| 2010/0207874 A1* | 8/2010 | Yuxin | G06F 3/017 345/156 |
| 2012/0105466 A1 | 5/2012 | Leslie | |
| 2013/0120668 A1* | 5/2013 | Ueda | G07C 1/24 348/744 |
| 2013/0250184 A1 | 9/2013 | Leclerc et al. | |
| 2013/0311566 A1 | 11/2013 | Milburn et al. | |
| 2016/0150034 A1* | 5/2016 | Caron | H04L 67/18 709/205 |
| 2016/0201888 A1* | 7/2016 | Ackley | H04N 5/2256 362/276 |

OTHER PUBLICATIONS

Barker, et al., "Investigating Political and Demographic Factors in Crowd Based Interfaces", In Proceedings of the 21st Annual Conference of the Australian Computer-Human Interaction Special Interest Group: Design: Open 24/7, Nov. 23, 2009, pp. 413-419.

Barkhuus, et al., "Engaging the Crowd: Studies of Audience-Performer Interaction", In Proceedings of Extended Abstracts on Human Factors in Computing Systems, Apr. 5, 2008, pp. 2925-2930.

"Blinkendroid", Retrieved on: Jan. 28, 2014, Available at: http://code.google.com/p/blinkendroid, pp. 1-2.

"Junkyard-Jumbotron", Retrieved on: Jan. 28, 2014, Available at: http://c4fcm.github.io/Junkyard-Jumbotron/, p. 1.

Brown, et al., "Crowd Computer Interaction", In Proceedings of Extended Abstracts on Human Factors in Computing Systems, Apr. 4, 2009, pp. 4755-4758.

Hinckley, et al., "Stitching: Pen Gestures that Span Multiple Displays", In Proceedings of the working conference on Advanced Visual Interfaces, May 25, 2004, pp. 23-31.

"LED Throwies", Retrieved on: Jan. 31, 2014, Available at: http://www.graffitiresearchlab.com/blog/projects/led-throwies/, pp. 1-3.

Lee-Delisle, Seb, "Pixelphones—A Huge Display Made with Smartphones", Sep. 17, 2011, Available at: http://seb.ly/2011/09/pixelphones-a-huge-display-made-with-smart-phones/, pp. 1-11.

Merrill, et al., "Siftables: Towards Sensor Network User Interfaces", In Proceedings of the 1st International Conference on Tangible and Embedded Interaction, Feb. 15, 2007, pp. 75-78.

Miyaoku, et al., "C-blink: A Hue-difference-Based Light Signal Marker for Large Screen Interaction via any Mobile Terminal, In Proceedings of the 17th Annual ACM Symposium on User Interface Software and Technology, Oct. 24, 2004, pp. 147-156.

Hara, et al., "Understanding Collective Play in an Urban Screen Game", In Proceedings of the ACM Conference on Computer Supported Cooperative Work, Nov. 8, 2008, pp. 67-76.

Reeves, et al., "Designing for Crowds", In Proceedings of the 6th Nordic Conference on Human-Computer Interaction: Extending Boundaries, Oct. 16, 2010, pp. 393-402.

Sato, et al., "Particle Display System—Virtually Perceivable Pixels with Randomly Distributed Physical Pixels", In Journal of Information Processing, vol. 17, Dec. 2009, pp. 280-291.

Schmitz, et al., "Ad-Hoc Multi-Displays for Mobile Interactive Applications", In Proceedings of 31st Annual Conference of the European Association for Computer Graphics, vol. 29, Issue 2, May 3, 2010, pp. 1-8.

Shannon, Claude E, "Communication in the Presence of Noise", In Proceedings of the I.R.E., Jan. 1949, pp. 10-21.

Terrenghi, et al., "A Taxonomy for and Analysis of Multi-Person-Display Ecosystems", In Journal of Personal and Ubiquitous Computing, vol. 13, Issue 8, Nov. 2009, pp. 583-598.

WeLikeSmall, "The iPod Wall", Retrieved on : Jan. 28, 2014, Available at: http://vimeo.com/13404489, pp. 1-3.

Murphy, P., G. Makhov, Scanning Audiences at Laser Shows: Theory and Practice, Laser Institute of America, Aug. 20, 2012, pp. 334-343.

* cited by examiner

| For Each Optical Projector, Find Which Projector Pixels Are Seen From Each Of A Plurality Of Prescribed Locations In The Audience | 500 |

↓

| For Each Of The Prescribed Locations In The Audience, Map Each Pixel In A Picture It Is Desired To Present To An Audience Member Or Members In The Prescribed Location To An Optical Projector Forming That Pixel And To The Particular Projector Pixel Or Pixels Of The Optical Projector That Are Seen From The Prescribed Location | 502 |

↓

| Generate A Projector Image For Each Optical Projector, By For Each Projector Image Being Generated, Setting Each Pixel Of The Projector Image To A Color And Brightness That Matches The Color And Brightness Of The Pixel Of The Picture It Is Desired To Present To An Audience Member Or Members In The Location Mapped To The Projector Pixel That Corresponds To The Projector Image Pixel | 504 |

PROJECTOR-BASED CROWD COORDINATION AND MESSAGING

BACKGROUND

When people attend a large event, such as a football game, they are generally relegated to passively watching the show, without participating. An exception to this is when the crowd does "the wave"—people stand and then sit back down, following the people next to them. As the wave propagates through the stands, the motion is clearly visible at a great distance, creating an entertaining spectacle. Performing the wave gives people a way of feeling like they are contributing to the show.

This sort of audience participation can also be purposely designed and encouraged. For example, audience members might be handed different color cards based on their seat positions, and told to lift them above their heads at the proper moment. Similarly, large groups of performers can be trained to take coordinated actions in the stands to create different visual effects.

SUMMARY

The projector-based crowd coordination and messaging embodiments described herein separately, yet simultaneously, convey information to members of an audience in at least one part of a venue.

In one single-projector embodiment, the projector-based crowd coordination and messaging system includes an optical projector mounted within the venue, and an image. The image is designed to convey the aforementioned information to each audience member whenever it is projected onto the audience. The information conveyed to each audience member is different from the information conveyed to at least one other audience member based a portion of the image projected onto each of their respective locations within the venue. Given this system, for each of a plurality of prescribed locations in the audience, the optical projector projects light of a prescribed color and brightness onto the location, where this light represents the information conveyed to an audience member or members in the location.

In one multiple-projector embodiment, the projector-based crowd coordination and messaging system includes an array of optical projectors mounted within the venue. Also included in this embodiment is a set of images, each of which has been designed for a different one of the optical projectors of the array. The set of images conveys the aforementioned information to members of the audience whenever the images are projected onto the audience. The information conveyed to each audience member is different from the information conveyed to at least one other audience member based the portion of each image projected onto each of their respective locations within the venue. Given this system, for each of a plurality of prescribed locations in the audience, each optical projector projects light of a prescribed color and brightness onto the location, where the light from the projectors collectively represents the information conveyed to an audience member or members in the location.

With regard to the image an optical projector projects onto the audience, in one embodiment, a computer is used to perform the following process actions. For each optical projector, it is found which projector pixels are seen from each of a plurality of prescribed locations in the audience. It is noted that each projector pixel of each optical projector corresponds to a pixel of a projector image being projected by that optical projector onto the audience. Next, for each of the prescribed locations in the audience, each pixel in a picture it is desired to present to an audience member or members in the prescribed location under consideration is mapped to an optical projector forming that pixel and to the particular projector pixel or pixels of the optical projector that are seen from the prescribed location. A projector image is then generated for each optical projector, where for each projector image being generated, each pixel of the projector image is set to a color and brightness that matches the color and brightness of the pixel of the picture it is desired to present to an audience member or members in the location mapped to the projector pixel that corresponds to the projector image pixel under consideration. Once projector images have been generated for each of the optical projectors, each optical projector is caused to simultaneously project its projector image onto the audience.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of projector-based crowd coordination and messaging embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

It is also noted that for the sake of clarity specific terminology will be resorted to in describing the projector-based crowd coordination and messaging embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the projector-based crowd coordination and messaging. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the projector-based crowd coordination and messaging does not inherently indicate any particular order not imply any limitations thereof.

1.0 Projector-Based Crowd Coordination And Messaging

The projector-based crowd coordination and messaging embodiments described herein generally employ one or more optical projectors to separately, yet simultaneously, convey real-time information to members of an audience in at least one part of a venue. The information that is conveyed to each audience member is different from the information conveyed to at least one other audience member based on their locations within the venue. All an audience member has to do is to look at the projector or projectors to see the information for his or her location.

Optical projectors are normally used to project an image on a surface. However, if one looks directly at a projector from a large distance, he or she will perceive it not as an image, but as a source of light akin to a light bulb. The color and brightness of the light will correspond to the color and brightness of the pixel or pixels that are shinning on that person. Thus, two people, standing fairly close to each other, could perceive the projector light as being of a different color and brightness if they have different pixels shinning on them.

Consider the case of a sports stadium venue. A projector mounted on the central scoreboard shinning on the audience can cast rays of different colors to different sections of the audience. These rays do not have to be bright enough to visibly reflect off the audience. The audience will still be able to see them quite clearly by looking in the direction of the projector. If they are then given the instruction: "when you see a red light, sit down, but when you see a flashing green light, stand up" the audience can be instructed en masse to create different patterns, simply through this projection. For example, they might be instructed to form the team logo when a point is scored. It could even be an animated logo as the pixel or pixels shinning on each audience member can change over time.

The projector-based crowd coordination and messaging embodiments described herein can employ any type of optical projector. For example, but without limitation, this includes analog film projectors, slide projectors, digital video projectors, and in general any device that produces illumination in such a fashion that the color and brightness of the light emitted to specific locations can be prescribed. With regard to the color and brightness of light emitted to a specific location, this is generally accomplished by the optical projector projecting an image. Each person in the audience where the image is projected sees the color and brightness of the projected pixels of the image that are landing on their eyes. In some optical projectors, such as film projectors and slide projectors, the image takes physical form. For example, the image can take the form of a frame of film, or film slide. In digital optical projectors, such as a digital video projector, the image takes the form of a digital image. A digital image is a numeric (e.g., binary) representation of a two-dimensional image. The video projector receives a video signal that includes the digital image and projects it, typically using a lens system. With regard to the color and brightness of the projected pixel of an image, it is understood that this can be characterized by any one, or any combination, of the RGB, CMYK, HSV, and HSL color spaces, including the possibility of not emitting any light at all. However, as a practical matter current optical projectors often do not have the contrast ratio for a pixel to not emit any light at all. As such, for the purposes of the projector-based crowd coordination and messaging embodiments described herein it is to be understood that when a projected pixel is said to have a particular color and brightness, this includes a color and brightness that is equivalent to no light being projected for that pixel (or as close as the projector can come to simulating this no light condition).

In one embodiment, a single optical projector projects pixels onto a crowd. By looking at the projector, each person sees the color and brightness of the projected pixels that are landing on their eyes. Simple messages, such as "sit" or "stand" can be encoded as different colors and/or temporal patterns. In another embodiment, multiple projectors are used. When an audience member looks at the array of projectors, it can appear to be a digital sign with each projector forming a pixel of the sign. Each person looking at the sign sees an image formed by the display pixels, where each appears to be the color and brightness of the projected pixel at that location. The image displayed on the sign can be made to appear different from different locations. The single and multiple projector embodiments will now be described in more detail.

1.1 Single-Projector Embodiments

Projector-based crowd coordination and messaging can be achieved using a single projector. In general, single-projector embodiments use a single projector that faces the audience. From the perspective of an audience member looking at the projector, a light source is seen. It will be seen as being the size of the projection lens, which is relatively small compared to the viewing distance. The color and brightness of this observed light source will be determined by the color and brightness of the pixel or pixels being projected on that audience member. If projected onto a crowd, each member of the crowd will perceive the color and brightness of the light to correspond with what is being projected on him or her. In a typical venue, the projector is far enough from the audience that the focus can be set to infinity without concern for depth of field issues.

Figure 1:
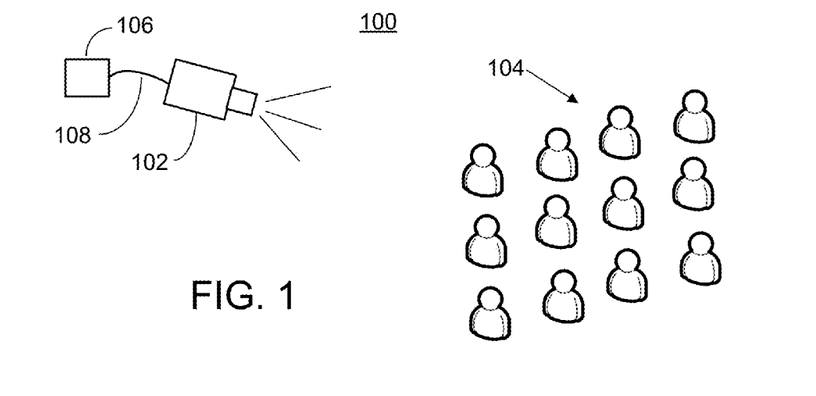
FIG. 1 is a diagram depicting an example of a single-projector configuration for implementing the projector-based crowd coordination and messaging embodiments described herein.

Referring to FIG. 1, an exemplary single-projector configuration is shown. An optical projector 102 is mounted so as to project onto an audience 104 in a venue 100. In the depicted exemplary embodiment, the optical projector 102 is a video projector that is driven via a video signal generating device 106. By way of example, but not limitation, the video signal generating device 106 can be a computer, DVD player, a solid state video player, or any device which produces a compatible video signal. It is noted that while the video signal generating device 106 is shown in the exemplary embodiment of FIG. 1 as a separate unit connected by a video cable 108 to the video projector 102, this need not be the case. In one implementation, the video signal generating device 106 is in wireless communication with the video projector 102. In another implementation, the video signal generating device 106 is incorporated within the video projector itself. The video signal generating device 106 causes the projector 102 to project an image onto the audience 104. The image is designed to convey information to each audience member when it is projected onto the audience 104. The information conveyed to each audience member is different from the information conveyed to at least one other audience member based a portion of the image projected onto each of their respective locations within the venue 100. For each of multiple prescribed locations in the audience 104, the optical projector 102 projects light of a prescribed color and brightness onto the location. This light represents the information conveyed to an audience member or members in that location.

Figure 2:
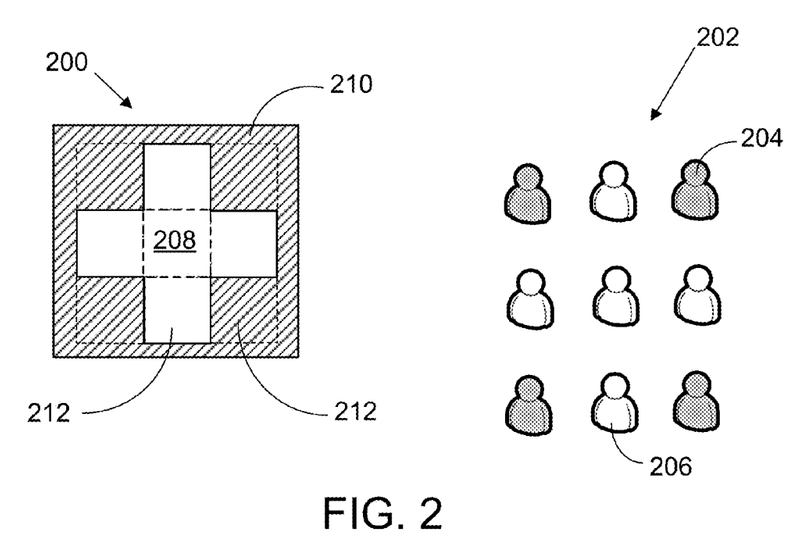
FIG. 2 is a diagram depicting an example of how an image projected by an optical projector onto an audience can be used to provide information to individual audience members at different locations.

Referring now to FIG. 2, an example of how an image projected by an optical projector onto an audience can be used to provide information to individual audience members at different locations is shown. In this example, the information is in the form of a pattern where it has been pre-arranged with the audience that when a member see a light when looking at the optical projector, he or she is to perform an action (e.g., stand up). Conversely, if an audience member does not see a light when looking at the optical projector, the pre-arranged action is not performed (e.g., the member stays seated).

In the foregoing example shown in FIG. 2, an optical projector is made to project the image 200 onto the audience 202. The image 200 includes a plus-shaped light region 208 surrounded by a black background 210 (shown as the hashed-striped region in FIG. 2). The size of the image 200 and the distance of the projector from the audience 202 are such that each square sub-region 212 shines on just one of the audience members. In FIG. 2, for convenience dashed lines are shown to demarcate the square sub-regions 212. However, in this example, these dashed lines do not actually exist in the image. When the audience 202 looks at the projector, certain ones of them 206 see a light coming from the projector, while the others 204 do not. In FIG. 2, the audience members not seeing the light from the projector are gray. The audience members 206 that see the light are the ones located in the part of the audience 202 where the plus-shaped light region of the image shines. Note that the audience members 206 seeing a light coming from the projector form a plus shape in the audience. Thus, for example, if these audience members 206 were previously instructed to stand when they saw a light coming from the projector, they would form a plus-shaped pattern in the audience 202. This plus-shape pattern could have some significance such as a team logo, and so on.

It is noted that much more complex shapes could be formed by the audience members using a more complex image. In addition, other actions are possible. For example, the audience members that see the light coming from the projector might be pre-instructed to lift-up a colored card to form a shape dictated by the light and dark areas of the projected image. It should be further understood that many different signaling methods are possible. By way of example, and not limitation, the image could project areas onto the audience that vary in color, brightness, temporal pattern (e.g., flashing), and so on. A combination of temporal change and color change may be particularly desirable to prevent issues with color blindness, and degree of flashing. To this end, in one implementation, the image projected by the optical projector onto the audience is changed such that the color or brightness of light, or both, projected onto at least one of the prescribed locations in the audience changes. It can also be made to appear to an audience member at a prescribed location that no light is being projected when the image changes. In one implementation, this is accomplished by making the color and brightness of the pixel or pixels of the projector image that are projected onto a prescribed location in the audience, a color and brightness that appears to an audience member viewing the pixel or pixels as devoid of light. As for the aforementioned flashing, in one implementation this is accomplished by changing the image projected by the optical projector onto the audience repeatedly over time such that, with each image change, either light is projected onto a prescribed location in the audience or it seems that no light is projected onto the prescribed location. The net effect of this is to create a temporal flashing at the prescribed location.

Figure 3:
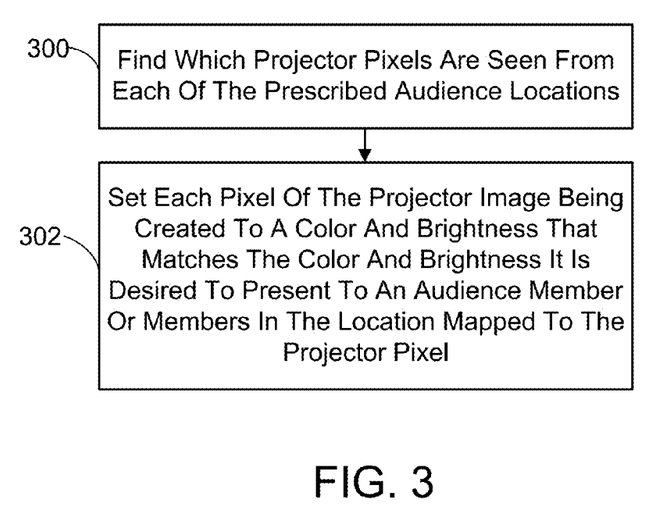
FIG. 3 is a flow diagram generally outlining one embodiment of a process for designing a projector image for a single-projector embodiment so that for each prescribed location in the audience the projector projects the color and brightness it is desired to present to an audience member or members in that location.

In one single-projector embodiment, an image (such as image 200 in FIG. 2) is designed for the projector so that from each prescribed location in the audience (such as a particular seat or an area with multiple seats) the projector projects the color and brightness it is desired to present to an audience member or members in that location. Referring to FIG. 3, this involves first finding which projector pixels are seen from each of the prescribed locations (process action 300). A projector pixel corresponds to a pixel of an image being projected by a projector onto the audience. It is noted that the portion of the image an audience member see from a particular location in the audience can be a part of a pixel of the image, or a pixel of the image, or a group of adjacent pixels of the image--with this last scenario being the typical case. As long as the position and orientation of the projector is not changed, the same pixel or pixels in any image projected will be seen from the same location in the audience. Once the projector pixels are mapped to audience locations, each pixel of the projector image being created is set to a color and brightness that matches the color it is desired to present to an audience member or members in the location mapped to the projector pixel under consideration (process action 302).

1.2 Multiple-Projector Embodiments

Projector-based crowd coordination and messaging can also be achieved using multiple optical projectors. In general, multiple-projector embodiments use two or more optical projectors (e.g., even up to 100,000 or more) that all face the audience.

In one embodiment, this involves replicating the above-described single-projector scheme to cover distinct areas of the audience. Thus, each optical projector would project an image on a portion of the audience. This is done as it may be impossible to project on all the people in a stadium from a single projector. In this multiple-projector embodiment, the entire audience can be covered by making sure all portions of the audience have a projector projecting an image on them. Any overlap can be handled by ensuring one of the projectors projecting an image on the same audience members or members projects an image in that area which is dark (e.g., the image being projected is black in that area so that an audience member looking at the projector would not see any light, whereas the other projector projecting a part of an image on the audience member might seem to be shining a light him or her (or not if that part of the image being projected by the other projector is also dark). It is also possible with this multiple-projector embodiment that only some areas of the audience have a projector projecting an image on the audience members in that area, while no projector projects an image on other areas of the audience.

In another multiple-projector embodiment, an array of projectors is employed that project images on the same portion (or all) of the audience. From the perspective of an audience member looking at these projectors, it would appear as an array of light sources each having the size of the projection lens of the projector emitting the light. In one implementation, the projectors are arranged so that each one forms a pixel of a larger display--akin to a digital sign. As before, the appearance of each of these projectors from the audience can be controlled by controlling what is projected to each audience member. In this fashion, the plurality of projectors forms a controllable display that can simultaneously appear differently from different locations. Thus, different content can be simultaneously displayed to different portions of the audience, or even to individual audience members.

Figure 4:
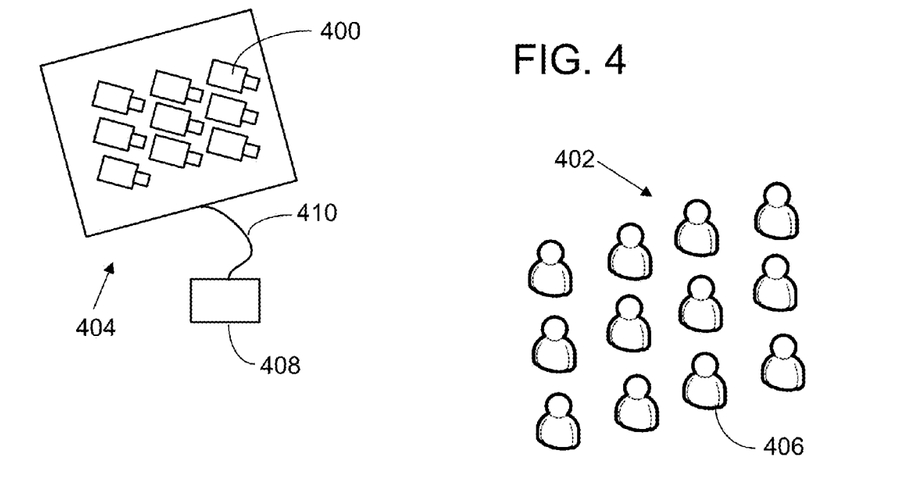
FIG. 4 is a diagram depicting an example of a multiple-projector configuration for implementing the projector-based crowd coordination and messaging embodiments described herein.

Referring to FIG. 4, an exemplary multiple-projector configuration is shown that reflects the foregoing implementation where an array of optical projectors mounted in a venue project images on the same portion (or all) of the audience to form a controllable display. As can be seen, the projectors 400 in this example are mounted and arranged in a 3×3 array which projects into the audience 402 to create the appearance of a digital sign 404 when audience members 406 look at the projectors. In the depicted exemplary embodiment, the optical projectors 400 are video projectors that are driven via a video signal generating device 408. By way of example, but not limitation, the video signal generating device 408 can be a computer, DVD player, a solid state video player, or any device which produces a compatible video signal. It is noted that while the video signal generating device 408 is shown in the exemplary embodiment of FIG. 4 as a separate unit connected by a video cable 410 to the video projectors 400, this need not be the case. In one implementation, the video signal generating device 408 is in wireless communication with the video projectors 400. The video signal generating device 408 causes each optical projector 400 it is connected to or in communication with to project an image onto the audience 402. It is further noted that while one video signal generating device 408 is shown in the exemplary embodiment shown in FIG. 4 and drives all the projectors 400, this also need not be the case. Rather, multiple video signal generating devices could be employed with each driving one or more of the projectors. In fact, each projector could have its own video signal generating device. In this latter implementation, the video signal generating device associated with each device need not be a separate unit. It could instead be integrated into the projector itself. Further, it is noted that embodiments involving multiple projectors are not limited to the configuration shown in FIG. 4. Rather, any number of projectors can be used and arranged in any array shape, either in a regularly-space or irregularly-spaced pattern.

The aforementioned image that each optical projector projects onto the audience is part of a set of images. Each of the images in the set is designed for a different one of the optical projectors of the array. The set of images conveys the aforementioned information to members of the audience when the images are projected onto the audience. The information conveyed to each audience member is different from the information conveyed to at least one other audience member based the portion of each image projected onto each of their respective locations within the venue. For each of multiple prescribed locations in the audience, each optical projector projects light of a prescribed color and brightness onto the location, where the light from the projectors collectively represents the information conveyed to an audience member or members in the location.

It is noted that in order to create the appearance of a digital sign, the size of the projector lenses and the spacing between them is made to create the impression that the projector lenses are part of the same image—akin to pixels in an digital sign. For example, if a larger lens size is employed, the projectors could be placed further apart while still creating the desired impression that they are all part of the same sign. On the other hand, to create the appearance of a higher-resolution image, a greater number of projectors are placed closer together. In such a case, the lenses may be made smaller.

Figure 5:
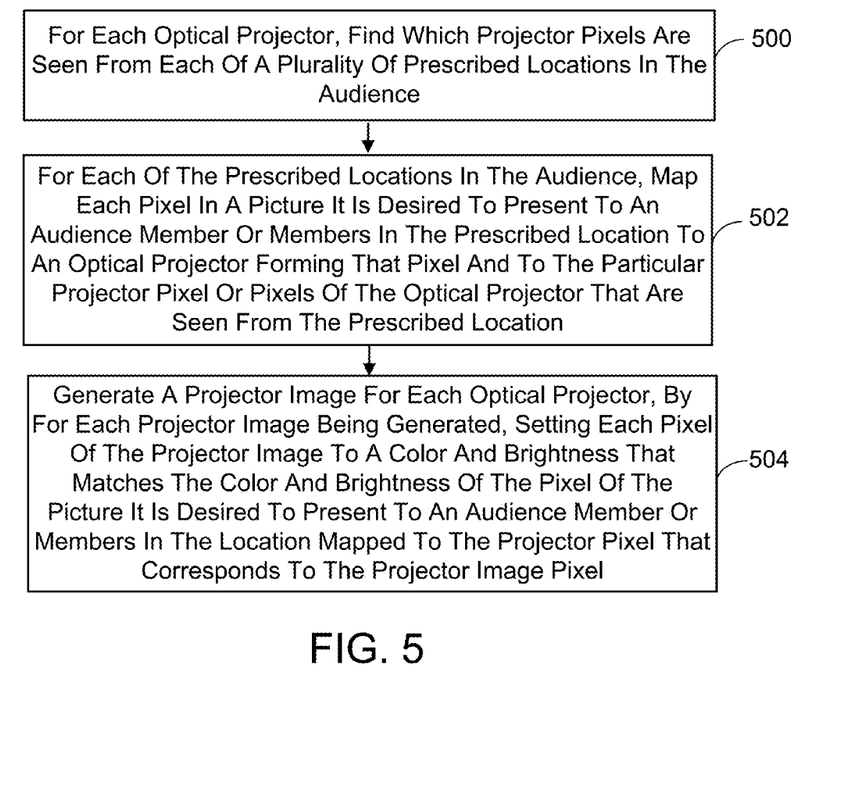
FIG. 5 is a flow diagram generally outlining one embodiment of a process for designing a projector image for each projector of a multiple-projector embodiment so that for each prescribed location in the audience each projector projects the color and brightness it is desired to present from that projector to an audience member or members in that location.

In view of the foregoing, an image is designed for each projector in the array so that from each prescribed location in the audience (such as a particular seat or an area with multiple seats) the projectors form the pixels of a picture it is desired to present to an audience member or members in that location. In one implementation, the projector image design scheme involves using a computer to perform the following process actions. Referring to FIG. 5, for each optical projector, it is found which projector pixels are seen from each of a plurality of prescribed locations in the audience (process action 500). It is noted that each projector pixel of each optical projector corresponds to a pixel of a projector image being projected by that optical projector onto the audience. Next, for each of the prescribed locations in the audience, each pixel in a picture it is desired to present to an audience member or members in the prescribed location under consideration is mapped to an optical projector forming that pixel and to the particular projector pixel or pixels of the optical projector that are seen from the prescribed location (process action 502). A projector image is then generated for each optical projector, which involves for each projector image being generated, each pixel of the projector image being set to a color and brightness that matches the color and brightness of the pixel of the picture it is desired to present to an audience member or members in the location mapped to the projector pixel that corresponds to the projector image pixel under consideration (process action 504). As described previously, once projector images have been generated for each of the optical projectors in the array, each optical projector is caused to simultaneously project its projector image onto the audience. It is noted that at any one time the picture formed by the projectors as seen from one of the prescribed audience locations can be different or the same as the picture seen from other audience locations. In other words, the picture formed by the projector array as seen from an audience location is tailored using the foregoing design scheme. The result of the design scheme is a set of images, one for each projector in the array. The picture formed by the projector array at any audience location can also change over time. This is done by repeating the foregoing design scheme to produce a new set of images for the projectors to project each time it is desired to change the picture seen from any audience location.

It is further noted that the foregoing process is equally applicable to generating a projector image for the optical projector in a single-projector embodiment. In that case, the picture it is desired to present to an audience member or members in each of the prescribed locations has only one pixel.

Figure 6:
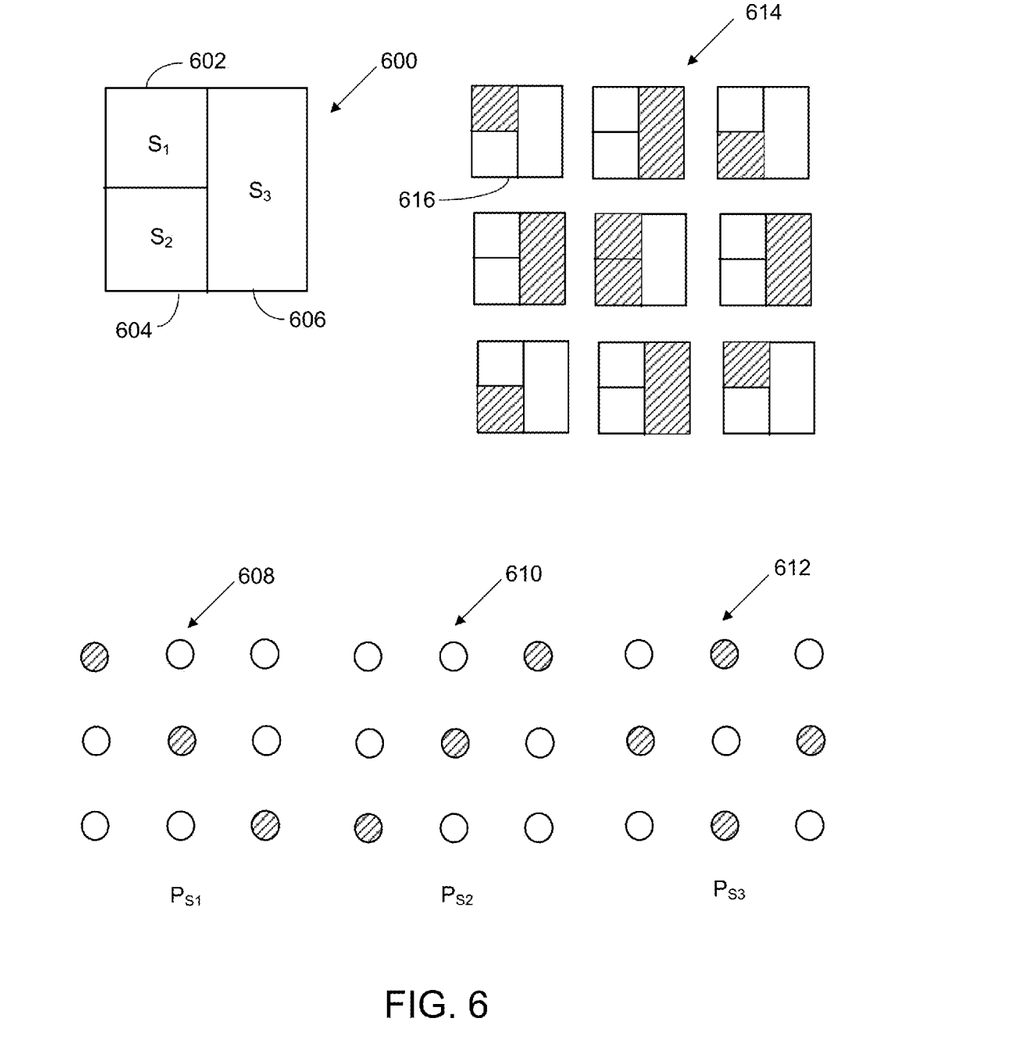
FIG. 6 is a diagram depicting a simplified example of the results of the design scheme for multiple optical projectors of FIG. 5.

FIG. 6 shows a simplified example of the results of the foregoing design scheme for multiple optical projectors. In this example, nine projectors form a square 3×3 projector array. The audience represented by the map 600 is divided into three regions 602, 604, 606 designated as $S_1$, $S_2$ and $S_3$, respectively. Each of these regions corresponds to a different one of the prescribed audience location described previously. It is desired that the pattern $P_{S1}$ 608 be seen by audience member(s) sitting in region $S_1$ 602, pattern $P_{S2}$ 610 be seen by audience member(s) sitting in region $S_2$ 604, and pattern $P_{S3}$ 612 be seen by audience member(s) sitting in region $S_3$ 606. Each of these patterns represents the previously-described picture it is desired to present to the audience member or members in each of the regions. Given the foregoing set-up, the previously described design scheme would produce the set of images 614. The images are arranged in FIG. 6 in a 3×3 pattern, and each image would be projected by the correspondingly located projector in the array. Notice, for example, image 616 has a dark area corresponding to the projector pixels that would project onto region $S_1$ 602, and light areas corresponding to the projector pixels that would project onto region $S_2$ 604 and $S_3$ 606. This image would be projected by the projector positioned in the upper left-hand corner of the projector array, and corresponds to the patterns 608, 610, 612 where audience member(s) in region $S_1$ 602 are to see the upper left-hand corner projector as dark, and audience member(s) in regions $S_2$ 604 and $S_3$ 606 are to see the upper left-hand corner projector as a light.

While in the foregoing example, each of the audience regions would see a different pattern of light and dark spots, the picture seen can be much richer. For example, each projector in the array could appear to be a colored light. Still further, the number of projectors in the array could be large enough that the pattern seen in an audience location would appear to be one or more text characters. In this regard, if the set of images being projected changes over time, the text character could be seen from the audience location as changing. They could be made to spell out a word over time in the case where a single text character is displayed at a time, or to form sentences over time in the case where multiple text characters representing words are displayed at the same time. The text characters could even be made to appear to be scrolling across the projector array over time. Yet further, if enough projectors are used and placed close enough together, they could appear to audience member(s) in a location as forming an image of a real or simulated scene. The projector image sets could be changed periodically to create the appearance of a picture sequence, and if changed fast enough appear to the audience member(s) at the location as a video. As described above, the patterns, colors, text, or images shown can vary from one audience location to another. This versatility provides an almost endless set of possibilities for conveying messages to the audience, coordinating actions of audience members, and entertaining the audience.

As with the previously described replication of the single-projector scheme to cover distinct areas of the audience, the multiple-projector embodiments involving the use of an array of projectors that project onto the same portion of the audience, can be replicated when it is impossible to project on all the people in a venue from a single array. In this implementation of the multiple-projector embodiment, more of the audience can be covered by making sure all of the audience (or at least desired portions of the audience) have a projector array projecting an image on them. The different arrays can be coordinated, and any overlap can be handled, using the previously described projector image design scheme.

1.3 Lens Array

Projector-based crowd coordination and messaging embodiments described herein regardless of whether they are single-projector and multiple-projector implementations can employ a lens array. In single-projector implementations, the effect of multiple projectors can be simulated through the use of a lens array, and in multiple-projector implementations, the number of projectors employed in a projector array can be reduced (and thereby reducing the cost as well).

In general, conventional lens array optics are used to split the image from a projector so that a portion of the image is projected from each of multiple lenses of the lens array. For the purposes of the projector-based crowd coordination and messaging embodiments described herein, each lens in a lens array is treated as if it is a separate virtual projector and operates in the same way as described previously for real projectors. Thus, the virtual projectors are mapped to the audience and images are designed in the same way, albeit the image created from each virtual projector in a lens array is combined to create the actual image that is projected from the associated real projector.

Even though a limited number of the projector pixels are projected from each lens in the lens array, this number is still large enough that at least one of the projector pixels (and in practice many) projected from a lens of the lens array can be seen from each of the desired locations in an audience. Granted, there is a tradeoff in that the resolution of picture projected by a lens of the lens array is lower than the lens of a projector owing to having fewer projection pixels. In addition, the brightness is also less for the same reason. However, since the number of projector pixels found in a typical projector (e.g., $10^6$) far exceeds the number of people in the largest of audiences (e.g., $10^4$), even if it is desired that every person in the audience see a different picture when looking at the lens array (or arrays), the apparent resolution and brightness should be satisfactory for most applications.

In view of the foregoing, in one implementation, lens array optics are employed with a single projector so that a different portion of the projector image is projected onto the audience by each of the multiple lenses. This simulates the multiple-projector embodiment where a group of projectors is employed to project images on the same portion (or all) of the audience. In another implementation, lens array optics are employed with a single projector so that a different portion of the image is projected onto each of a plurality of different parts of the audience by each of the multiple lenses. This simulates the multiple-projector embodiment where the single-projector scheme is replicated to cover distinct areas of the audience. In yet another implementation, at least one set of lens array optics is employed in a multiple-projector system, where the multiple lenses of each set employed splits the image projected from a different one of the optical projectors of the projector array so that a different portion of the image projected by that optical projector is projected onto the audience by each of the multiple lenses. This is not different in operation from the multiple-projector embodiment described previously, except that fewer projectors would be required to produce the same effect.

It is noted that a flat panel display designed for direct viewing can be employed as a digital optical projector, and can be adapted to create a projector array. In this embodiment, a suitable lens array is placed in front of the flat panel display, and the image projected by each lens in the array would be the image formed by the pixels of the flat panel display behind the lens. In the case of a transmissive flat panel display, such as some LCD panels, the brightness can be increased by replacing the backlighting unit thereof with a more powerful light source.

1.4 Alignment

Figure 7:
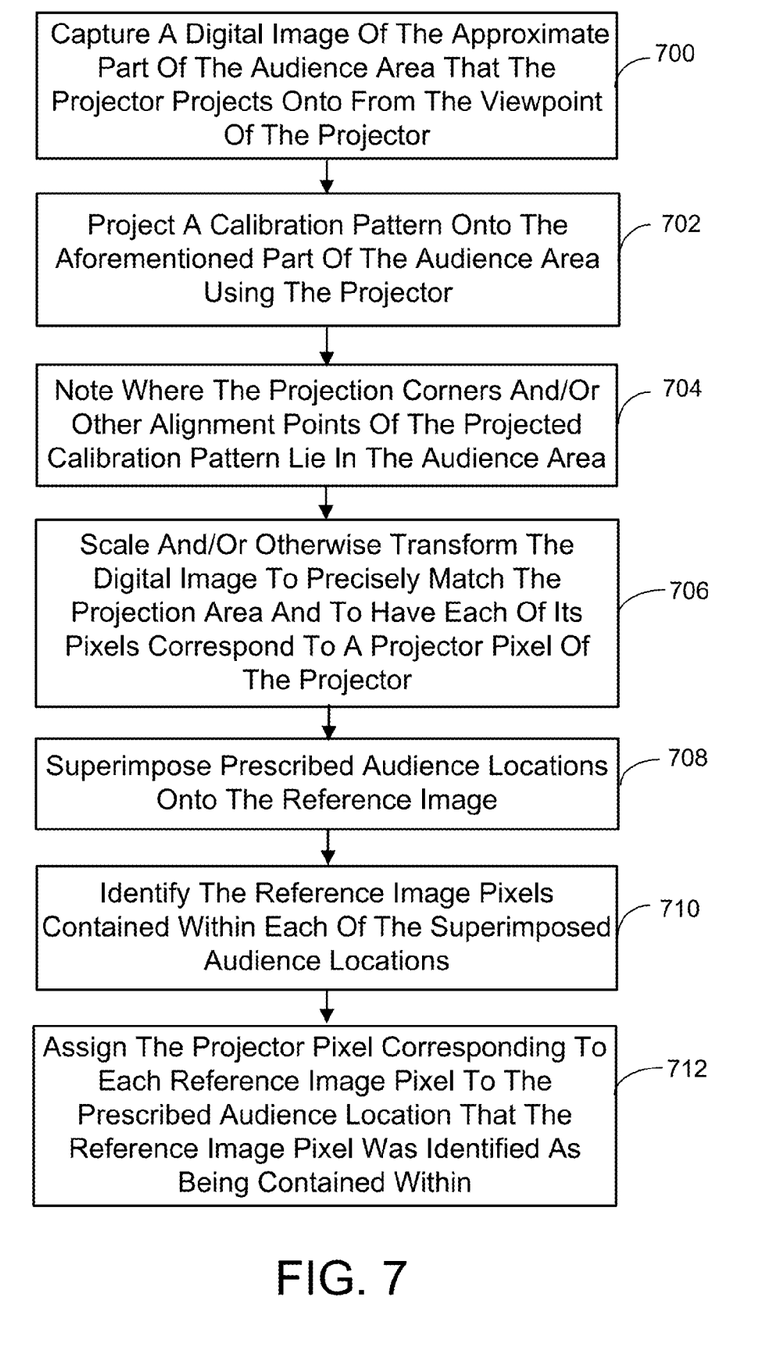
FIG. 7 is a flow diagram generally outlining an implementation of the part of the process of FIG. 5 involving finding which projector pixels are seen from each of the prescribed audience locations.

In the previously-provided description of the projector image design schemes, one of the process actions involved finding which projector pixels are seen from each of the prescribed audience locations. In one embodiment, this is accomplished using the following alignment procedure. Referring to FIG. 7, first a digital image of the approximate part of the audience area that the projector projects onto is taken from the viewpoint of the projector (process action 700). Note that in a smaller venue this could be the entire audience area. Then, a calibration pattern is projected onto the aforementioned part of the audience area using the projector (process action 702). For example, this calibration pattern could be a grid. It is then noted where the projection corners and/or other alignment points of the projected calibration pattern lie in the audience area (process action 704). The bounds of the projected calibration pattern define a projection area which corresponds to the part of the audience area that the projector projects onto. Next, the digital image is scaled and/or otherwise transformed to precisely match the projection area and to have each of its pixels correspond to a projector pixel of the projector (process action 706). The modified digital image is a reference image that can used to find which projector pixels are seen from each prescribed audience locations. More particularly, prescribed audience locations (as described previously) are superimposed onto the reference image (process action 708). The reference image pixels contained within each of the superimposed audience locations are then identified (process action 710), and the projector pixel corresponding to each reference image pixel is assigned to the prescribed audience location that the reference image pixel was identified as being contained within (process action 712).

2.0 Exemplary Operating Environments

Figure 8:
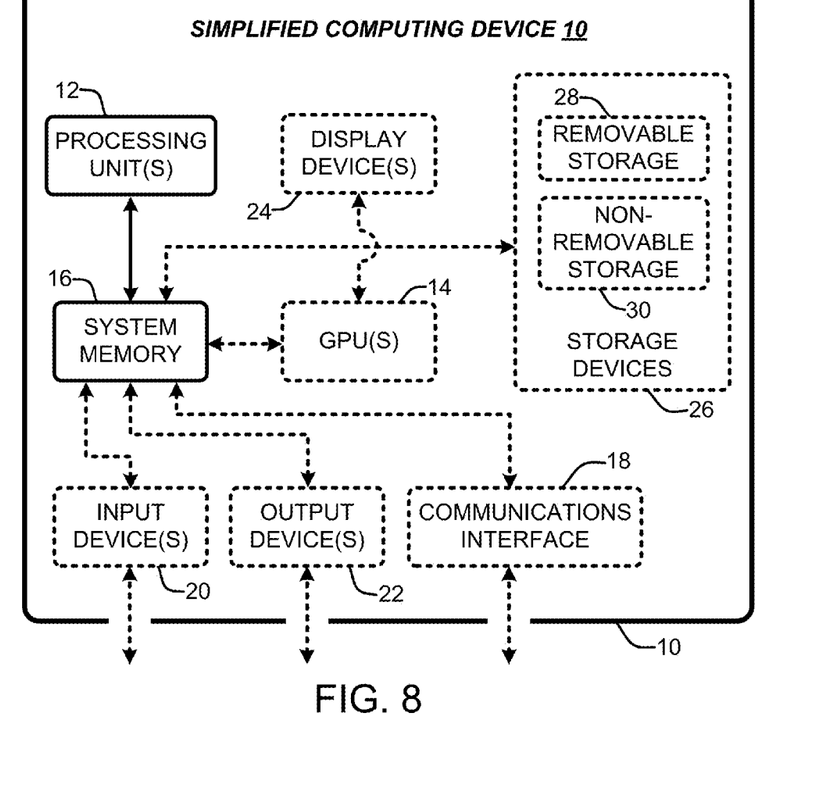
FIG. 8 is a diagram depicting a general purpose computing device constituting an exemplary system for implementing process aspects of the projector-based crowd coordination and messaging embodiments described herein.

The process aspects of the projector-based crowd coordination and messaging embodiments described herein are operational within numerous types of general purpose or special purpose computing system environments or configurations. FIG. 8 illustrates a simplified example of a general-purpose computer system on which various embodiments and elements of the process aspects of the projector-based crowd coordination and messaging, as described herein, may be implemented. It is noted that any boxes that are represented by broken or dashed lines in the simplified computing device 10 shown in FIG. 8 represent alternate embodiments of the simplified computing device. As described below, any or all of these alternate embodiments may be used in combination with other alternate embodiments that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the process aspects of the projector-based crowd coordination and messaging embodiments described herein, the device should have a sufficient computational capability and system memory to enable basic computational operations. In particular, the computational capability of the simplified computing device 10 shown in FIG. 8 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 shown in FIG. 8 may also include other components such as a communications interface 18. The simplified computing device 10 may also include one or more conventional computer input devices 20 (e.g., pointing devices, keyboards, audio (e.g., voice) input devices, video input devices, haptic input devices, gesture recognition devices, devices for receiving wired or wireless data transmissions, and the like). The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 8 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various process aspects of the projector-based crowd coordination and messaging embodiments described herein, or portions thereof, may be stored, received, transmitted, or read from any desired combination of computer-readable or machine-readable media or storage devices and communication media in the form of computer-executable instructions or other data structures.

Finally, the process aspects of the projector-based crowd coordination and messaging embodiments described herein may be further described in the general context of computer-executable instructions, such as program modules, being executed by a computing device. Generally, program modules include routines, programs, objects, components, data structures, and the like, that perform particular tasks or implement particular abstract data types. The process aspects of the projector-based crowd coordination and messaging embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

3.0 Other Embodiments

While the projector-based crowd coordination and messaging embodiments described heretofore involved conveying information to members of an audience in a venue, this can be expanded in scope. For example, rather than being employed for just entertainment purposes, embodiments of projector-based crowd coordination and messaging can be used for crowd control. In this application, for instance, people are directed to the nearest exits based on their location in the venue. Embodiments of projector-based crowd coordination and messaging can also be combined with a conventional tracking system. For example, such a hybrid system can be used for traffic control. In one embodiment, a multiple-projector array is used as a street or highway sign and individual cars are tracked to obtain their current location and speed as they approach the sign. The sign could then, for example, project the current speed of a car to the car's current location. Embodiments of projector-based crowd coordination and messaging can be further combined with a conventional identification system that identifies a person currently within viewing distance of a multiple-projector array. Once the identity and location of a person is known, information specific to that person could be projected to their location. In one embodiment, such a hybrid system could be employed for targeted advertising. An identified person's location could also be tracked, such that information targeted for that person would be projected to new locations as the person moves about a space.

It is further noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A projector-based crowd coordination and messaging system for separately, yet simultaneously, conveying information to members of an audience in at least one part of a venue, the system comprising:
   an optical projector mounted within the venue; and
   an image which has been designed to convey said information to each audience member whenever it is projected onto the audience, said information conveyed to each audience member being different from the information conveyed to at least one other audience member based on a portion of the image projected onto each of their respective locations within the venue; wherein
   for each of a plurality of prescribed locations in the audience, the optical projector continuously projects light of a prescribed color and brightness directly onto one or more eyes of an audience member or members in the location whenever the light is being projected, said light by itself as projected being the information conveyed to the audience member or members in the location whenever the light is projected onto and seen by the audience member or members in the location.

2. The system of claim 1, wherein said portion of the image is one of a part of a pixel of the image, or a pixel of the image, or a group of adjacent pixels of the image.

3. The system of claim 1, wherein the color and brightness that a pixel of a projector image is set to comprise a color and brightness that appears to an audience member viewing the projector pixel corresponding to the projector image pixel as devoid of light.

4. The system of. claim 3, wherein the image projected by the optical projector onto the audience is changed such that the color or brightness of light, or both, projected onto at least one of the prescribed locations in the audience changes.

5. The system of claim 3, wherein the image projected by the optical projector onto the audience is changed repeatedly over time in a manner that in at least one of the prescribed locations in the audience the projected light appears to be temporally flashing.

6. The system of claim 1, wherein the image projected onto the audience forms a pattern where a first color, or brightness, or both, of the light projected onto one or more first locations in the audience is different from a color, or brightness, or both, of light projected onto other locations in the audience, and wherein it has been pre-arranged with members of the audience that when a member sees a light exhibiting said first color, or brightness, or both when looking at the optical projector, he or she is to perform a prescribed action, and when a member does not see a light exhibiting said first color, or brightness, or both when looking at the optical projector, the prescribed action is not performed.

7. The system of claim 1, further comprising lens array optics having multiple lenses which split the image projected from the optical projector so that a different portion of the image is projected onto the audience by each of the multiple lenses.

8. The system of claim 1, further comprising lens array optics having multiple lenses which split the image projected from the optical projector so that a different portion of the image is projected onto each of a plurality of different parts of the audience by each of the multiple lenses.

9. A projector-based crowd coordination and messaging system for separately, yet simultaneously, conveying information to members of an audience in at least one part of a venue, the system comprising:

an array of optical projectors mounted within the venue; and a set of images each of which has been designed for a different one of the optical projectors of the array, the set of images conveying said information to members of the audience whenever the images are projected onto the audience, said information conveyed to each audience member being different from the information conveyed to at least one other audience member based on the portion of each image projected onto each of their locations within the venue; wherein for each of a plurality of prescribed locations in the audience, each optical projector continuously projects light of a prescribed color and brightness directly onto one or more eyes of an audience member or members in the location whenever the light is being projected, said light from the projectors collectively and by itself as projected being the information conveyed to the audience member or members in the location whenever the light is projected onto and seen by the audience member or members in the location.

10. The system of claim 9, wherein the optical projectors of the array of projectors are arranged so that when viewed from each of said prescribed locations, each projector forms a pixel of digital sign, and wherein whenever an optical projector of the array of projectors projects light onto a prescribed location in the audience, the color or brightness of the light, or both, depends on the portion of the image projected onto the prescribed location such that the appearance of the pixels of the digital sign can vary between the prescribed locations.

11. The system of claim 10, wherein the number optical projectors of the array is large enough that, as viewed from at least one of the prescribed location in the audience, a pattern formed by the pixels of the digital sign appears as one or more text characters.

12. The system of claim 11, wherein the pattern formed by the pixels of the digital sign that appear as one or more text characters as viewed from at least one of the prescribed location in the audience, changes repeatedly over time such that with each pattern change the pixels of the digital sign appear as a new text character or new text characters, such that a word or words are spelled out over time.

13. The system of claim 11, wherein the pattern formed by the pixels of the digital sign that appear as one or more text characters as viewed from at least one of the prescribed location in the audience, changes repeatedly over time such that the text character or characters formed by the pixels of the digital sign appear to be scrolling across the digital sign.

14. The system of claim 10, wherein the number of optical projectors of the array is large enough that, as viewed from at least one of the prescribed location in the audience, a pattern formed by the pixels of the digital sign appears as an image of a real or simulated scene.

15. The system of claim 14, wherein the pattern formed by the pixels of the digital sign that appear as an image of a real or simulated scene as viewed from at least one of the prescribed location in the audience, changes repeatedly over time such that with each pattern change the pixels of the digital sign appear as a new image of a real or simulated scene.

16. The system of claim 14, wherein the pattern formed by the pixels of the digital sign that appear as an image of a real or simulated scene as viewed from at least one of the prescribed location in the audience, changes repeatedly at a pace sufficient to make the pixels of the digital sign appear as to be playing a video.

17. The system of claim 9, further comprising at least one set of lens array optics, each set having multiple lenses which split the image projected from a different one of the optical projectors of the array of projectors so that a different portion of the image projected by that optical projector is projected onto the audience by each of the multiple lenses.

18. A projector-based crowd coordination and messaging system for separately, yet simultaneously, conveying information to members of an audience in at least one part of a venue, the system comprising:

an array of optical projectors mounted within the venue; and a set of images each of which has been designed for a different one of the optical projectors of the array, the set of images conveying said information to members of the audience whenever the images are projected onto the audience, said information conveyed to each audience member being different from the information conveyed to at least one other audience member based on the portion of each image projected onto each of their locations within the venue; wherein for each of a plurality of prescribed locations in the audience, one or more of the optical projectors continuously projects light of a prescribed color and brightness directly onto one or more eyes of an audience member or members in the location whenever light from the one or more projectors is being projected, said light from the projectors collectively and by itself as projected being the information conveyed to the audience member or members in the location whenever the light is projected onto and seen by the audience member or members in the location.

19. The system of claim 18, wherein one or more of the images projected by the optical projectors onto the audience is changed such that the color or brightness of light, or both, projected onto at least one of the prescribed locations in the audience changes.

* * * * *